US008889209B2

(12) United States Patent
Kruesemann et al.

(10) Patent No.: US 8,889,209 B2
(45) Date of Patent: Nov. 18, 2014

(54) METHOD OF TREATING A WHEY PROTEIN CONCENTRATE BY MICROPARTICULATION

(75) Inventors: Dieter Kruesemann, Hamburg (DE); Jan Nordanger, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 328 days.

(21) Appl. No.: 12/515,550

(22) PCT Filed: Nov. 21, 2007

(86) PCT No.: PCT/SE2007/001023
§ 371 (c)(1),
(2), (4) Date: May 20, 2009

(87) PCT Pub. No.: WO2008/063115
PCT Pub. Date: May 29, 2008

(65) Prior Publication Data
US 2010/0047423 A1 Feb. 25, 2010

(30) Foreign Application Priority Data

Nov. 22, 2006 (SE) .................... 0602474-9

(51) Int. Cl.
*A01J 11/16* (2006.01)
*A23J 3/08* (2006.01)
*A23C 3/033* (2006.01)
*A23C 21/00* (2006.01)
*A23J 1/20* (2006.01)

(52) U.S. Cl.
CPC ................. *A23J 3/08* (2013.01); *A23C 3/0337* (2013.01); *A01J 11/16* (2013.01); *A23C 21/00* (2013.01); *A23C 3/0335* (2013.01); *A23J 1/205* (2013.01)

USPC ........................... 426/583; 426/519; 426/520

(58) Field of Classification Search
CPC .... A23C 3/0355; A23C 3/0337; A23C 21/00; A23V 2300/26; A23V 2300/31; A23V 2300/41; A01J 11/16; A23J 3/08; A23J 1/2053
USPC ................. 426/583, 656, 657, 490, 491, 519, 426/520–522
See application file for complete search history.

(56) References Cited

U.S. PATENT DOCUMENTS 3,615,663 A * 10/1971 Becker .......................... 426/471
4,253,386 A * 3/1981 Egnell .............................. 99/453
(Continued)

FOREIGN PATENT DOCUMENTS

DE 10 2004 041 770 A1 3/2006
GB 2 005 123 A 4/1979
(Continued)

OTHER PUBLICATIONS

Form PCT/ISA/210 (International Search Report) dated Nov. 22, 2006.

*Primary Examiner* — Drew Becker
(74) *Attorney, Agent, or Firm* — Buchanan Ingersoll & Rooney PC

(57) ABSTRACT

The present invention relates to a method of treating a whey protein by microparticulation. The microparticulation comprises heat treatment and mechanical processing of the whey protein. The method comprises the steps that the protein concentrate is caused to pass a high pressure pump and that the protein concentrate, at elevated pressure, is thereafter heat treated. After the heat treatment, the protein concentrate undergoes a mechanical processing.

14 Claims, 1 Drawing Sheet

(56) References Cited

U.S. PATENT DOCUMENTS

| | | | |
|---|---|---|---|
| 4,734,287 A * | 3/1988 | Singer et al. | 426/41 |
| 5,171,603 A * | 12/1992 | Singer et al. | 426/572 |
| 5,215,777 A * | 6/1993 | Asher et al. | 426/565 |
| 6,536,940 B1 * | 3/2003 | Kolb et al. | 366/336 |
| 6,605,311 B2 * | 8/2003 | Villagran et al. | 426/656 |
| 7,250,183 B2 * | 7/2007 | Lindstrom et al. | 426/36 |
| 7,811,620 B2 * | 10/2010 | Merrill et al. | 426/656 |
| 2008/0038424 A1 * | 2/2008 | Krusemann | 426/491 |
| 2009/0087538 A1 * | 4/2009 | Havea | 426/583 |

FOREIGN PATENT DOCUMENTS

| | | |
|---|---|---|
| WO | WO 93/07761 A1 | 4/1993 |
| WO | WO 2006/024395 A1 | 3/2006 |
| WO | WO 2006/058538 A1 | 6/2006 |

\* cited by examiner

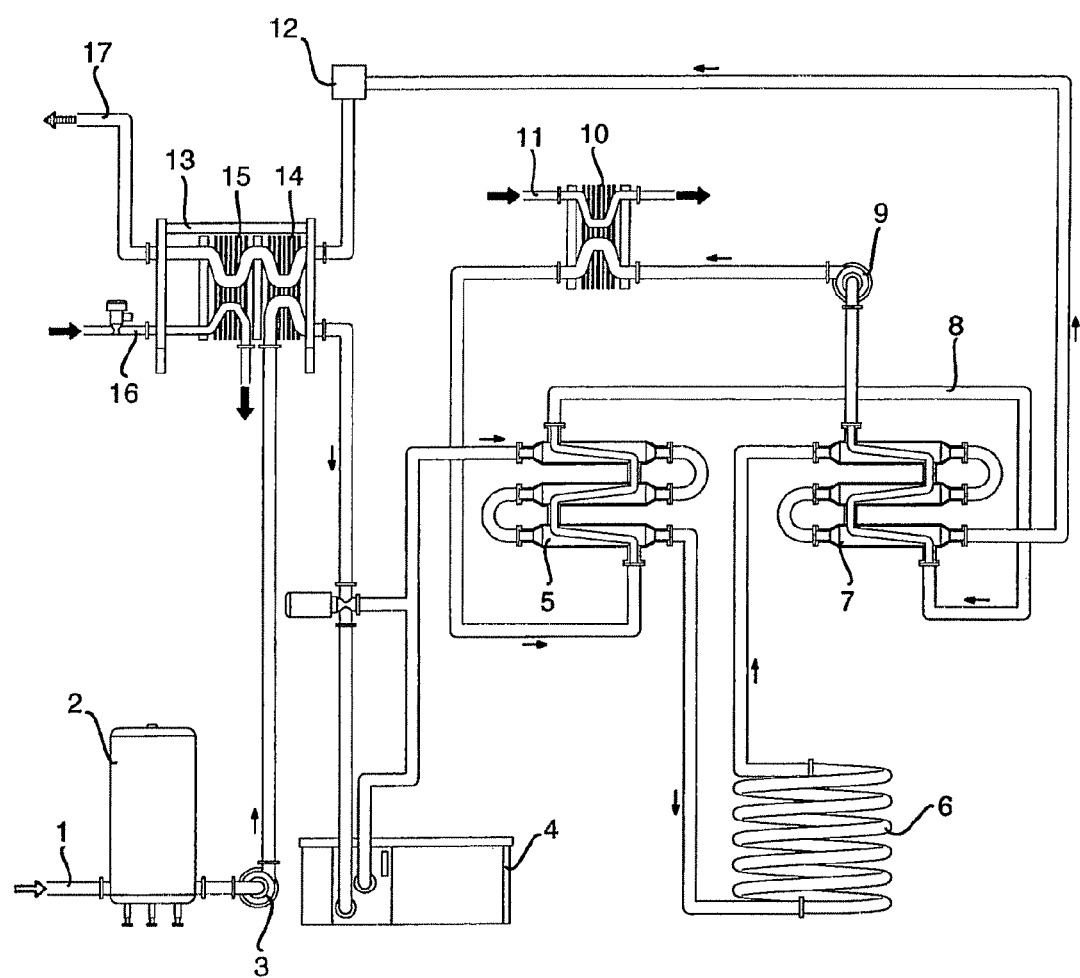

METHOD OF TREATING A WHEY PROTEIN CONCENTRATE BY MICROPARTICULATION

TECHNICAL FIELD

The present invention relates to a method of treating a whey protein concentrate by microparticulation, the microparticulation comprising heat treatment and mechanical processing of the protein concentrate.

BACKGROUND ART

Whey, which is a residual product in cheese and caseine production, is one of the largest protein reserves which until only recently has begun to be employed as a raw material in food production. Whey constitutes 80-90% of the milk which is employed in cheesemaking and it contains approximately 50% of all of the nutrient substances which are originally to be found in the milk.

Whey is concentrated to WPC (Whey Protein Concentrate) by micro- or ultra filtration. WPC constitutes the retentate from this process and WPC also constitutes substantially that raw material for which the method according to the present invention is intended.

In order to expand the practical fields of application of whey proteins, it is most general practice today to cause the whey concentrate to undergo a microparticulation. Microparticulation implies that the whey proteins, by heat treatment, are denaturated and aggregated, i.e. are lumped together, whereafter the aggregations, as a result of mechanical processing, are divided into smaller particles. As a result of microparticulation, a product will be obtained which can be employed in many different food products. The denaturated whey protein will have another flavour and a different appearance from the original whey protein, which also contributes to increasing the use of whey protein in the food industry.

International Patent Application WO 2006/024395 A1 describes a microparticulation process where whey concentrate is heat treated and thereafter subjected to a mechanical processing. The heat treatment takes place in a scrape heat exchanger and the mechanical processing in a homogeniser.

Problem Structure

One object of the present invention is to render even more efficient the microparticulation so as to obtain a high protein denaturation.

A further object of the present invention is to be able to "customise" the particle size for the finished product.

Yet a further object of the present invention is that the method gives a satisfactory deactivation of bacteriophages.

Solution

These and other objects have been attained according to the present invention in that the method of the type described by way of introduction has been given the characterising features that the protein concentrate is caused to pass a high pressure pump, and that the protein concentrate is heat treated under elevated pressure, whereafter the protein concentrate undergoes a mechanical processing.

Preferred embodiments of the present invention have further been given the characterising features as set forth in the appended subclaims.

BRIEF DESCRIPTION OF THE ACCOMPANYING DRAWING

One preferred embodiment of the present invention will now be described in greater detail hereinbelow, with reference to the accompanying Drawing. In the accompanying Drawing:

FIG. 1 is a flow diagram of the method according to the present invention.

DESCRIPTION OF PREFERRED EMBODIMENT

The present invention relates to a method of microparticulation of whey proteins. The raw material for the process is a WPC solution (Whey Protein Concentrate) which is obtained from whey by micro- or ultra filtration. The whey protein concentrate constitutes the retentate from this process. The whey protein concentrate is an isabelline liquid with a flavour of whey. Since whey is a sensitive and perishable product, is must be processed immediately after collection, or alternatively cooled and stored.

The method is illustrated in FIG. 1 in the form of a flow diagram. The whey protein concentrate enters into the process through the conduit 1. The conduit 1 may be directly connected to the retentate side of an ultrafiltration plant for extracting concentrate, or alternatively be connected to a storage silo. The raw material may also be a WPC powder dissolved in water.

The whey protein concentrate passes through a balance tank 2 and a centrifugal pump 3 before the concentrate is preheated to approx. 75° C. in a heat exchanger 13. The heat exchanger 13 is shown in FIG. 1 as a plate heat exchanger, but other types of heat exchangers may also be employed. As heating medium, use is preferably made of product which is located downstream in the process and which is to be cooled. Alternatively, use is made of hot water as the heating medium. 75° C. is the temperature at which the whey product begins to denaturate.

Thereafter, the preheated protein concentrate is caused to pass a high pressure pump. Preferably, use is made of the high pressure pump in a homogeniser 4 without the whey protein passing through any homogenisation equipment. Alternatively, a different type of high pressure pump may be employed, such as a positive, or impeller, pump. The whey protein is pressurised to approx. 40-80 bar.

Since the product, during the greater part of the following process, is pressurised at 40-80 bar, this has a favourable effect on the deactivation of bacteriophages. Bacteriophages occur naturally in whey and, if they are active, destroy most types of bacteria. This may be disastrous if desirable bacteria exist which have been added in a special production process, for example in cheese and yoghurt production.

The pressurised whey protein is thereafter caused to pass through one or more heat exchanger elements 5, where the protein is heated to 85-140° C., preferably 85-125° C. In the preferred embodiment where the whey protein is intended to be used for cheesemaking, the protein is heated to 95° C. In the preferred embodiment, the heat exchanger elements 5 consist of tube heat exchanger elements, but scraper heat exchangers or other heat exchangers suitable for the product may be employed. The tubular heat exchanger preferably consists of a mono-tube or a tubular heat exchanger with concentric tubes, so that the viscous product more readily can pass. The heat exchanger element 5 can also be combined with heating by an injector or an infusor.

In a buffer pipe or holding cell 6 which is placed after the heat exchanger elements 5, the product is caused to stay during 3-30 minutes, preferably 5-20 minutes and in the preferred embodiment at least 15 minutes, at the desired temperature in order to achieve as high a denaturation as possible. For denatured whey protein intended for cheesemaking, the stay time is at least 15 minutes. The buffer pipe or holding cell 6 normally consists of a helical conduit. Alternatively, a conduit of other configuration, which permits stay times of up to 20 minutes, may be employed.

While staying in the heat exchanger elements 5 and in the buffer pipe or holder cell 6, the whey protein undergoes denaturation. At the same time, the protein aggregates, i.e. it lumps together.

After the stay time in the buffer pipe or holding cell 6, the now denatured whey product is conveyed further to one or more heat exchanger elements 7 where the whey protein is cooled to approx. 75° C. The heat exchanger elements 7 consist, in the preferred embodiment, of tube heat exchanger elements, but scraper heat exchangers or other heat exchangers suitable for the product may be employed. The tubular heat exchanger preferably consists of a mono-tube or a tubular heat exchanger with concentric tubes, so that the viscous product more readily can pass.

As heat transfer medium in the heat exchanger elements 5, 7, use is made, in the preferred embodiment of the present invention, of a closed water conduit 8 which heats and cools, respectively, in the heat exchanger elements 5, 7. The closed water conduit has a centrifugal pump 9 and a heat exchanger 10. The heat exchanger 10 is preferably a plate heat exchanger, but other types of heat exchangers may also be employed. In the heat exchanger 10, the water in the water conduit is heated by means of hot water or steam from a conduit 11. The apparatus is adapted for a high thermal utilisation for the process.

The finished product, which is denaturated and aggregated, is now led further for mechanical processing, to homogenisation equipment 12 which may be the homogenisation equipment in a homogeniser 4 in which the product is forced to pass a narrow gap. The same homogeniser 4 may be employed for pressurising the product for carrying out the process, in the high pressure pump of the homogeniser 4, but, in practice, the main parts of the homogeniser 4 have been separated. In other words, the high pressure pump and the homogenisation equipment 12 of said homogeniser 4 are positioned differently in the apparatus which is employed for the method according to the present invention. Alternatively, some other form of mechanical processing equipment, such as a mixer or blender, or the like, may be employed.

As a result of the mechanical processing, the denaturated and aggregated whey protein is finely divided. In this part of the process, it is desirable to obtain a particle size of the finely-divided protein which has as narrow a spectrum as possible. At the same time, it is desirable to be able to "customise" the particle size for specific applications. Thus, for example in cheesemaking, the intention is to obtain particles which are between 3 and 10 μm. By combining different parameters, such as the height of the homogenising gap, or different forms of equipment in the mechanical processing, it is possible to attain the desired particle size of the finished whey product. The process also makes it possible to achieve other specific product properties, such as water bonding capability and density.

The finished product, which consists of denaturated and finely-divided whey protein has obtained a new appearance and flavour as a result of the process and is reminiscent of a creamy, milk-like liquid. The method according to the present invention, where the product is most generally at elevated pressure, results in there being a reduced risk of clogging of the product, when this is modified in the process by denaturation and aggregation.

The finished product is now cooled in a heat exchanger 13, and this heat exchanger may also be employed in accordance with the foregoing for heating the raw material entering into the process. For a maximum utilisation of the thermal energy, the heated finished product is caused to heat up the cold raw material in one or more sections 14 of the heat exchanger 13. In one or more additional sections 15, the finished product is cooled further in that use is made as coolant medium of iced water entering into the heat exchanger 13 through the conduit 16.

The thus microparticulated product departs from the processing equipment through the conduit 17 and is conveyed further to storage in tanks in order later to be able to be employed as raw material in, for example, cheesemaking or other food production. Alternatively, the microparticulated product may pass direct to some other processing equipment, such as evaporation equipment for the production of whey powder.

As will have been apparent from the foregoing description, the present invention realises a method of microparticulation of whey protein by heat treatment and mechanical processing which gives a product with high protein denaturation. The particles in the finished product may be "customised" for that application for which the product is intended. The method according to the present invention also gives a deactivation of bacteriophages in the whey protein.

What is claimed is:

1. A method of treating a whey protein concentrate by microparticulation, the microparticulation comprising heat treatment and mechanical processing of the protein concentrate, wherein the protein concentrate is pressurized by a high pressure pump to a pressure of approximately 40-80 bar; and that the pressurized protein concentrate is heat treated, wherein the heat treatment takes place in one or more tube heat exchanger elements, whereafter the protein concentrate is caused to stay in a buffer pipe during a stay time of 3-30 minutes before it undergoes a mechanical processing.

2. The method as claimed in claim 1, wherein the mechanical processing takes place in homogenisation equipment.

3. The method as claimed in claim 1, wherein the heat treatment takes place at 85-140° C.

4. The method as claimed in claim 1, wherein the heat treatment takes place at 85-125° C.

5. The method as claimed in claim 3, wherein the stay time is 5-20 minutes.

6. The method as claimed in claim 1, wherein the heat treatment takes place at 95° C.

7. The method as claimed in claim 4, wherein the stay time is 5-20 minutes.

8. The method as claimed in claim 1, wherein the protein concentrate is denatured as a result of the heat treatment prior to undergoing the mechanical processing.

9. A method of treating a whey protein concentrate by microparticulation, the microparticulation comprising heat treatment and mechanical processing of the protein concentrate, wherein the protein concentrate is pressurized by a high pressure pump to a pressure of approximately 40-80 bar and the pressurized protein concentrate is heat treated for at least 15 minutes, wherein the heat treatment takes place in one or more tube heat exchanger elements, after which the concentrate undergoes a mechanical processing.

10. The method as claimed in claim 9, wherein the mechanical processing takes place in homogenisation equipment.

11. The method as claimed in claim 9, wherein the heat treatment takes place at 85-140° C.

12. The method as claimed in claim 9, wherein the heat treatment takes place at 85-125° C.

13. The method as claimed in claim 9, wherein the heat treatment takes place at 95° C.

14. The method as claimed in claim 9, wherein the protein concentrate is denatured as a result of the heat treatment prior to undergoing the mechanical processing.

* * * * *